A. L. & W. H. WELLS.
Fly-Traps.

No. 153,186. Patented July 21, 1874.

Witnesses:
L. N. Sawyer
J. H. Elliott

Inventors:
Alpheus L. Wells,
William H. Wells,
By G. D. Chapin,
Atty

UNITED STATES PATENT OFFICE.

ALPHEUS L. WELLS AND WILLIAM H. WELLS, OF CHICAGO, ILLINOIS.

IMPROVEMENT IN FLY-TRAPS.

Specification forming part of Letters Patent No. 153,186, dated July 21, 1874; application filed May 6, 1874.

*To all whom it may concern:*

Be it known that we, ALPHEUS L. WELLS and WILLIAM H. WELLS, of Chicago, in the county of Cook and State of Illinois, have invented certain new and useful Improvements in Fly-Traps, of which the following is a specification:

The nature of the present invention consists in inclined glass valves pivoted to the ends of the cage by peculiarly-constructed socket-pivots. A space is left between the upper edges of the valves to admit flies to the cage, and the valves turn on the pivots, that the flies, after being killed, may be removed. Buttons at the bottom of the valves hold the latter in position for use.

Figure 1:
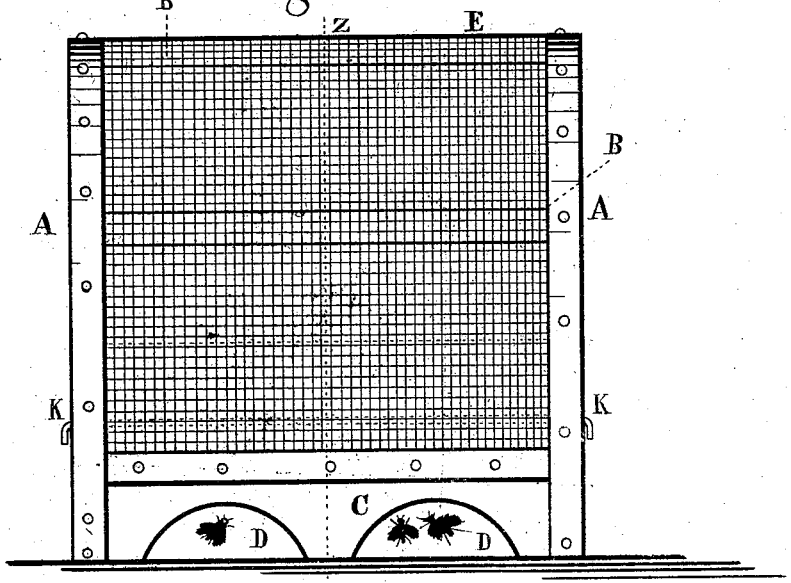
Figure 2:
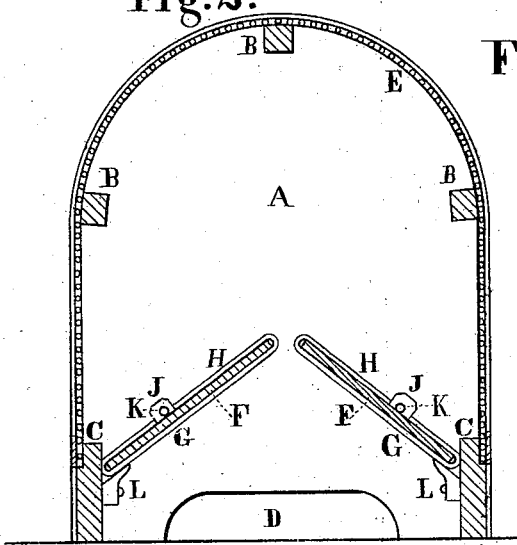
Figure 3:
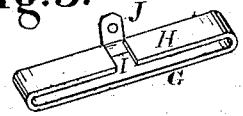

In the drawing, Figure 1 is an elevation of our improvement in fly-traps; Fig. 2, a transverse section of Fig. 1, taken on line Z; Fig. 3, a perspective representation of one of the socket-pivots which support the valves.

A represents the ends of the cage, which are to be made of wood or any other suitable material, and they are connected together by purlins B and sills C, openings D being cut through the sills and ends for the ingress of flies. The frame thus formed is covered with wire cloth E in the ordinary manner of such work. F F represent valves which are made of glass, that flies may see through them into the cage and be enticed therein by seeing flies that have previously entered, and which are pivoted to the ends A by means of sockets G H, formed with orifices I therein, to receive the ends of the valves. Lugs J project outwardly from the socket parts, and have holes formed in them to receive a rod, K, on which the valves turn. The lower edges of these valves, when in position for the flies to enter the cage, come closely to the sills C, and their upper edges are a sufficient distance apart to admit flies into the cage, the lower edges being held to the sills C by means of buttons L. In practice, a strip of white card-board may be placed over the opening between the valves, at a suitable height to admit flies, and be fastened to the ends A, better to attract flies by that which appears to be light.

To use the trap, the glass valves F should be set as shown in Fig. 2, and their bottom edges fastened to the sills C by the buttons L. The trap is then to be set in any desired place, and, after the flies have accumulated inside thereof, they can be drowned and then removed by turning the buttons L, to allow the valves to turn to vertical positions.

Any suitable bait can be suspended from the inside of the cage to attract flies.

We claim as new—

1. The glass valves F F, provided with the sockets G H, in combination with the rods K, buttons L, and the cage, as set forth.

2. The glass valves F F, provided with the sockets G H, in combination with the rod K and a cage provided with sills C, ends A, and openings D, substantially as described and shown.

ALPHEUS L. WELLS.
WM. H. WELLS.

Witnesses:
G. L. CHAPIN,
J. H. ELLIOTT.